United States Patent [19]
Yuen et al.

[11] Patent Number: 5,995,092
[45] Date of Patent: Nov. 30, 1999

[54] TELEVISION SYSTEM AND METHOD FOR SUBSCRIPTION OF INFORMATION SERVICES

[76] Inventors: Henry C. Yuen, P.O. Box 1159, Redondo Beach, Calif. 90278; Roy J. Mankovitz, 18057 Medley Dr., Encino, Calif. 91316; Daniel S. Kwoh, 3975 Hampstead Rd., La Canada/Flintridge, Calif. 91011; Elsie Y. Leung, 1302 Via Del Rey, South Pasadena, Calif. 91030

[21] Appl. No.: 08/853,702

[22] Filed: May 13, 1997

Related U.S. Application Data

[60] Provisional application No. 60/024,965, Aug. 30, 1996.

[51] Int. Cl.⁶ .................................................. H04N 7/173
[52] U.S. Cl. ............................... 345/327; 348/12; 455/5.1
[58] Field of Search .............................. 345/327; 348/10, 348/7, 12, 13, 468, 461, 462, 463, 464, 465, 466, 467, 478, 472; 455/6.2, 6.3, 5.1, 4.2; 709/217, 218, 219

[56] References Cited

U.S. PATENT DOCUMENTS

| | | |
|---|---|---|
| 4,890,321 | 12/1989 | Seth-Smith et al. ...................... 380/20 |
| 5,231,665 | 7/1993 | Auld et al. .................................. 380/20 |
| 5,357,276 | 10/1994 | Banker et al. .............................. 348/7 |
| 5,418,559 | 5/1995 | Blahut ....................................... 348/10 |
| 5,438,355 | 8/1995 | Palmer ....................................... 348/1 |

*Primary Examiner*—Chris Grant
*Attorney, Agent, or Firm*—Christie, Parker & Hale, LLP

[57] ABSTRACT

A system for sending selected up-to-date information in a television signal from a sender located at a network head-end or television station to a receiver co-located with a television viewer. The television viewer subscribes to an information service by telephoning a customer service center affiliated with the sender. The customer service center informs the sender of the subscription and the sender sends data packets of information individually targeted for the television viewer in the vertical blanking interval of the television signal. The television viewer's receiver accepts the data packets identified for it and on viewer command displays information included therein on the television screen. The data packets may include information relating to news, sports results, financial market updates, television programming guides, and the like. Information is displayed to the viewer in a menu format, allowing for ease of use in controlling presentation of various types of information.

35 Claims, 13 Drawing Sheets

FIG. 3

SUBSCRIPTION PACKET TYPE=4D
NUMBER OF SELECTION SERVICE=04h

| NAME OF SUBSCRIPTION SERVICES (24 CHARACTERS MAXIMUM) | PROMOTION MESSAGE ID | SUBSCRIPTION ID | SIZE OF THIS SUBSCRIPTION SERVICES | GUIDE CHANNEL OF THIS SERVICES THAT WILL BE DOWNLOADED |
|---|---|---|---|---|
| SPORTS | 31h | 32h | 04h (1K BYTES) | 2h |
| MUSIC | 32h | 27h | 08h (2K BYTES) | 2h |
| SCIENCE | 16h | 29h | 04h (1K BYTES) | 2h |
| PUBLICS | 18h | 20h | 02h (.5K BYTES) | 2h |

HOST SCHEDULES OF SUBSCRIPTION SERVICE:

| HOST SCHEDULE | GUIDE CHANNEL | START TIME | DURATION TIME | HOST SCHEDULE | GUIDE CHANNEL | START TIME | DURATION TIME |
|---|---|---|---|---|---|---|---|
| 1 | 2 | 8:00 | 0:30 | 5 | 2 | 10:00 | 0:30 |
| 2 | 2 | 8:30 | 0:30 | 6 | 2 | 10:30 | 0:30 |
| 3 | 2 | 9:00 | 0:30 | 7 | 2 | 11:00 | 0:30 |
| 4 | 2 | 9:30 | 0:30 | 8 | 2 | 11:30 | 0:30 |

HOST SCHEDULES OF TV GUIDE GOLD:

| HOST SCHEDULE | GUIDE CHANNEL | START TIME | DURATION TIME | HOST SCHEDULE | GUIDE CHANNEL | START TIME | DURATION TIME |
|---|---|---|---|---|---|---|---|
| 1 | 2 | 12:00 | 0:30 | 5 | 2 | 14:00 | 0:30 |
| 2 | 2 | 12:30 | 0:30 | 6 | 2 | 14:30 | 0:30 |
| 3 | 2 | 13:00 | 0:30 | 7 | 2 | 15:00 | 0:30 |
| 4 | 2 | 13:30 | 0:30 | 8 | 2 | 15:30 | 0:30 |

FIG. 4a

| | | |
|---|---|---|
| 1 | PACKET TYPE NUMBER | ~200 |
| 2 | TOTAL NUMBER OF BLOCKS IN THIS PACKET | ~202 |
| 3(LSB) 4(MSB) | TOTAL LENGTH OF THIS PACKET FROM BYTE 3 TO END OF THIS PACKET | ~204 |
| 5 | RESERVED | ~206 |
| 6 | SUBSCRIPTION PACKET TYPE | ~208 |
| 7-8 | SIGNATURE OF THIS PACKET | ~210 |
| 9 | PROMOTION MESSAGE TIME-OUT | ~212 |
| 10-11 | RESERVED | ~214 |
| 12 | NUMBER OF SELECTION SERVICE | ~216 |
| 13 | PROMOTION MESSAGE ID | ~218 |
| 14 | SUBSCRIPTION ID OF FIRST SUBSCRIPTION SERVICES | ~220 |
| 15 | GUIDE CHANNEL OF FIRST SUBSCRIPTION SERVICES | ~224 |
| 16 | SIZE OF FIRST SUBSCRIPTION SERVICES | |
| 17-40 | NAME OF FIRST SUBSCRIPTION SERVICES | |
| 41 | PROMOTION MESSAGE ID | |
| 42 | SUBSCRIPTION ID OF SECOND SUBSCRIPTION SERVICES | |
| 43 | GUIDE CHANNEL OF SECOND SUBSCRIPTION SERVICES | 226 |
| 44 | SIZE OF SECOND SUBSCRIPTION SERVICES | |
| 45-68 | NAME OF SECOND SUBSCRIPTION SERVICES | |
| 69-MAX.684 | REPEAT THE THIRD, FOURTH, ETC. SUBSCRIPTION SERVICES | ~228 |

FIG.4b

| 685 | CONTENT LENGTH OF HOST SCHEDULE OF SUBSCRIPTION SERVICE | ~230 |
| --- | --- | --- |
| 686 | RESERVED | ~232 |
| 687 | RESERVED | |
| 688-689 | PRUNING BYTE OF SCHEDULE OF SUBSCRIPTION SERVICE(INCLUDING TV GUIDE GOLD SUBSCRIPTION PRI) | ~234 |
| 690-691 | GUIDE CHANNEL NUMBER OF SUBSCRIPTION SERVICE | ~236 |
| 692 | SCHEDULE START TIME HIGH | ~238 |
| 693 | SCHEDULE START TIME MINUTE AND DURATION HOUR | ~240 |
| 694 | DURATION MINUTE | ~242 |
| 695-729 | 2ND. TO 8TH. SCHEDULES THIS PACKET MUST EXIST EVEN IF THIS SCHEDULE IS NOT VALID | ~244 |

FIG.4c

| 730 | CONTENT LENGTH OF HOST SCHEDULE OF TV GUIDE GOLD | |
|---|---|---|
| 731 | RESERVED | |
| 732 | RESERVED | |
| 733-734 (DISABLE) | PRUNING BYTE OF SCHEDULE OF TV GUIDE GOLD(ONLY SIPG) | |
| 735-736 | GUIDE CHANNEL NUMBER OF TV GUIDE GOLD | |
| 737 | SCHEDULE START TIME HIGH | |
| 738 | SCHEDULE START TIME MINUTE AND DURATION HOUR | |
| 739 | DURATION MINUTE | |
| 740-774 | 2ND. TO 8TH. SCHEDULES THIS PACKET MUST EXIST EVEN IF THIS SCHEDULE IS NOT VALID | |
| 775 | 1ST. LEVEL DETAIL LENGTH | ~246 |
| 776- | 1ST. LEVEL DETAIL (COMPRESSED TEXT) | ~248 |

FIG.5

| | | |
|---|---|---|
| 1 | PACKET TYPE NUMBER | ~250 |
| 2 | TOTAL NUMBER OF BLOCKS IN THIS PACKET | ~252 |
| 3(LSB) 4(MSB) | TOTAL LENGTH OF THIS PACKET FROM BYTE 3 TO END OF THIS PACKET | ~254 |
| 5 | RESERVED | ~256 |
| 6 | SUBSCRIPTION PACKET TYPE | ~258 |
| 7 | PROMOTION SERVICES ID | ~260 |
| 8-11 | RESERVED | ~262 |
| 12 (DISABLE) | ROW INPUT POSITION OF USER ID | ~264 |
| 13 (DISABLE) | COLUMN INPUT POSITION OF USER ID | ~266 |
| 14 (DISABLE) | ROW INPUT POSITION OF SERVICE ID | ~268 |
| 15 (DISABLE) | COLUMN POSITION OF SERVICE ID | ~270 |
| 16,17 | BROADCAST ID | ~272 |
| 18,19 | EXPIRE TIME OF FREE TRIAL | ~274 |
| 20 | SUBSCRIPTION ID | ~276 |
| 21-27 | RESERVED(7 BYTES) | ~278 |
| 28 | 1ST. LEVEL DETAIL LENGTH | ~280 |
| 29-m | 1ST. LEVEL DETAIL (COMPRESSED) | ~282 |
| m+1-n | 2ND. LEVEL DETAIL LENGTH (1 BYTE) | |
| n+1-p | 2ND. LEVEL DETAIL OF 1ST. PAGE | |
| p+1-q | 2ND. LEVEL DETAIL OF 1ST. PAGE (1 BYTE) | |
| q+1- | 2ND. LEVEL DETAIL OF 2ND. PAGE | |

FIG. 6

| | | |
|---|---|---|
| 1 | PACKET TYPE NUMBER | ~284 |
| 2 | TOTAL NUMBER OF BLOCKS IN THIS PACKET | ~286 |
| 3(LSB) 4(MSB) | TOTAL LENGTH OF THIS PACKET FROM BYTE 3 TO END OF THIS PACKET | ~288 |
| 5 | RESERVED | ~290 |
| 6 | SUBSCRIPTION PACKET TYPE | ~292 |
| 7-8 | SIGNATURE OF THIS PACKET | ~294 |
| 9 | ACTIVATION AND DE-ACTIVATION OF USER 30h / MASS ACTIVATION AND DE-ACTIVATION 31h | ~296 |
| 10-13 | OLD USER ID (4 BYTES) / START RANGE OF USER ID TO BE ACTIVATED AND DE-ACTIVATED | ~298 |
| 14-17 | NEW USER ID (4 BYTES) / END RANGE OF USER ID TO BE ACTIVATED AND DE-ACTIVATED | ~300 |
| 18 | SUBSCRIPTION ID OF SUBSCRIPTION SERVICE THAT WILL BE ACTIVATED OR DEACTIVATED | ~302 |
| 19-20 | EXPIRE TIME | ~304 |
| 21 (DISABLE) | WARNING DAY | ~306 |
| 22 | MONTH | ~308 |
| 23 | RESERVED | |
| 24-43 | TELEPHONE NUMBER PLAIN TEXT (20 BYTES) | ~310 |
| 44-64 | FILL WITH NULL CHARACTERS TO ENABLE SCRAMBLING | ~312 |

FIG. 7

| | | |
|---|---|---|
| 1 | PACKET TYPE NUMBER | ~314 |
| 2 | TOTAL NUMBER OF BLOCKS IN THIS PACKET | ~316 |
| 3(LSB) 4(MSB) | TOTAL LENGTH OF THIS PACKET FROM BYTE 3 TO END OF THIS PACKET | ~318 |
| 5 | TITLE LENGTH OF COMPRESSED TEXT | ~320 |
| 6 | SUBSCRIPTION PACKET TYPE | ~322 |
| 7 | SUBSCRIPTION ID | ~324 |
| 8 | RESERVED | ~326 |
| 9(LSB) 10(MSB) | SIGNATURE | ~328 |
| 11-m | TITLE COMPRESSED TEXT | ~330 |
| m+1 | 1ST. LEVEL DETAIL LENGTH MAX. 60 UNCOMPRESSED TEXT | ~332 |
| m+2-n | 1ST. LEVEL DETAIL COMPRESSED TEXT | ~334 |
| n+1 | 2ND. LEVEL DETAIL LENGTH (1 OR 2 BYTES) MAX. 510 COMPRESSED TEXT | ~336 |
| n+2- | 2ND. LEVEL DETAIL COMPRESSED CHARACTERS | ~338 |

FIG. 14

| SURF | SERV | PRINT |
|---|---|---|
| 406 | OLYMPICS<br>PRESS DIGIT TO SELECT | |

OLYMPICS
- 1  TRACK/FIELD
- 2  SWIMMING
- 3  GYMNASTICS
- 4  SOCCER
- 5  VOLLEYBALL
- 6  TABLE TENNIS
- 7  ARCHERY

MORE ▼

FIG. 15

| SURF | SERV | PRINT |
|---|---|---|
| 406 | RESULTS OF OLYMPIC EVENTS TODAY | |

TABLE TENNIS SEMI-FINALS AT THE OLYMPICS (8/1, 15:20 EDT): '92 OLYMPICS CHAMPION, J. WALDNER OF SWEDEN, CONTINUED HIS MARCH TO DEFEND HIS TITLE BY BEATING KIM TAK SOO OF S. KOREA IN A 5 GAME CLIFF-HANGER: 23-21, 22-20, 20-22, 19-21, 25-23. HE WILL MEET CURRENT —424

MORE ▼

TELEVISION SYSTEM AND METHOD FOR SUBSCRIPTION OF INFORMATION SERVICES

This application claims the benefit of U.S. Provisional Application No. 60/024,965, filed Aug. 30, 1996, and PCT Application No. PCT/US96/17920, filed Nov. 8, 1996.

FIELD OF THE INVENTION

This invention relates generally to television systems and more specifically to a television system allowing a viewer to subscribe to a data service wherein packets of information are selectively sent in the television signal for display on the viewer's television at the viewer's command.

BACKGROUND OF THE INVENTION

The general public has an ever increasing desire for obtaining up-to-date information relating to a variety of events and activities. For example, consumers like to be informed of current events such as international, national and local news, financial market news, sports results, and entertainment guides, in a real-time manner, without having to wait to see the next day's newspaper or the nightly evening news. Consumers also desire to control the timing of the receipt of the information so it can be available when the consumer wants to be informed. Furthermore, consumers want to receive only the information that interests them, without having to wade through other, unwanted information.

Recently, on-line computer services have provided such information to consumers in a controlled, selectable manner. However, the on-line services require the use of expensive specialized equipment such as personal computers, modems, and software, and require a certain level of sophistication and experience using the equipment. Many households do not have or cannot afford such equipment. Additionally, when a consumer is watching television and desires to receive selected up-to-date information, it is awkward and time-consuming for the consumer to go to the consumer's personal computer, initialize it, log on to an on-line information service, and request the desired information (possibly paging through many other screens of information in order to locate the desired data).

A more useful information delivery system is needed that combines the real-time information distribution features of an on-line information service with the ease of use, low cost, and existing broadcasting infrastructure of a television system.

SUMMARY OF THE INVENTION

The present invention is a system for sending data packets in the television signal to a selected television viewer. The data packets correspond to an information service that the television viewer subscribes to by calling a customer service center for the information service. A sender at a network head-end or television station receives subscriber information and inserts the data packets in the vertical blanking interval of the broadcast television signal with appropriate identifiers to enable the television viewer's receiver equipment (such as a television or a video cassette recorder) to accept and decode the data packets. The data packets containing up-to-date information are displayed on the television screen upon command by the viewer.

In an embodiment of the present invention, a subscription television system for providing selected current information from a subscription service provider to an individually addressable television viewer comprises a customer service center for subscribing by the individually addressable television viewer to at least one subscription information service provided by the subscription service provider; a sender located at the subscription service provider for sending a data packet including selected current information of the subscription information service subscribed to by the individually addressable television viewer, the sender including a sender controller for building the data packet uniquely identified for the individually addressable television viewer and for receiving subscription requests from the customer service center and for controlling insertion of the data packet into the television signal, and an inserter for inserting the data packet into the vertical blanking interval of a television signal, a transmitter for transmitting the television signal, and a receiver co-located with the individually addressable television viewer for receiving the television signal, the receiver including a receiver controller for accepting the data packet in the television signal when the data packet is identified for the individually addressable television viewer, for extracting the selected current information from the accepted data packet, and for controlling display of the extracted information when requested by the individually addressable television viewer, a memory for storing the extracted information, and a display for displaying the extracted information to the individually addressable television viewer.

Still other objects and advantages of the present invention will become readily apparent to those skilled in the art from the following detailed description, wherein is shown and described only the preferred embodiment of the invention, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DESCRIPTION OF THE DRAWINGS

FIG. 3 is an overview of some of the information contained in an example Services Selection Packet.

FIGS. 4a–4c are diagrams of the format of a Services Selection Packet.

FIG. 5 is a diagram of the format of the Promotion Packet.

FIG. 6 is a diagram of the format of an Activation Packet.

FIG. 7 is a diagram of the format of a Subscription Services Program Related Information (PRI) Packet.

FIG. 14 is an example of a display of a second level menu page.

FIG. 15 is an example of a display of the Table Tennis third level menu page.

DETAILED DESCRIPTION OF THE INVENTION

The present subscription television system uses a television broadcast system and video cassette recorder (VCR) as shown in U.S. Pat. No. 5,488,409, incorporated herein by reference, and a Guide Plus+ device as shown in application Ser. No. 08/475,395, and Ser. No. 08/364,708, also incorporated herein by reference.

In the preferred embodiment of the present system, a Host is a logical data broadcasting entity residing on a television broadcast signal. It appears in the form of a set of data packets that are sent through the Vertical Blanking Interval (VBI) lines in a National Television Standards Committee (NTSC) signal. The television signal is received by a standard television tuner and the data packets are extracted from the VBI lines by circuitry in the receiver. The receiver may be a VCR, television, satellite receiver, or Guide Plus+ device. The receiver then decodes the data packets and implements the functions contained therein. Four types of hosts are defined for carrying data over the VBI according to the Guide Plus+ system. The types of Hosts are Normal Show Information Packet (SIP) Host, Promotion Host, Service Host, and TV Guide+ Gold SIP Host. Note that the Host is a logical entity. As a result, a TV station can carry more than one Host in the VBI lines of its broadcast signal.

Figure 1:
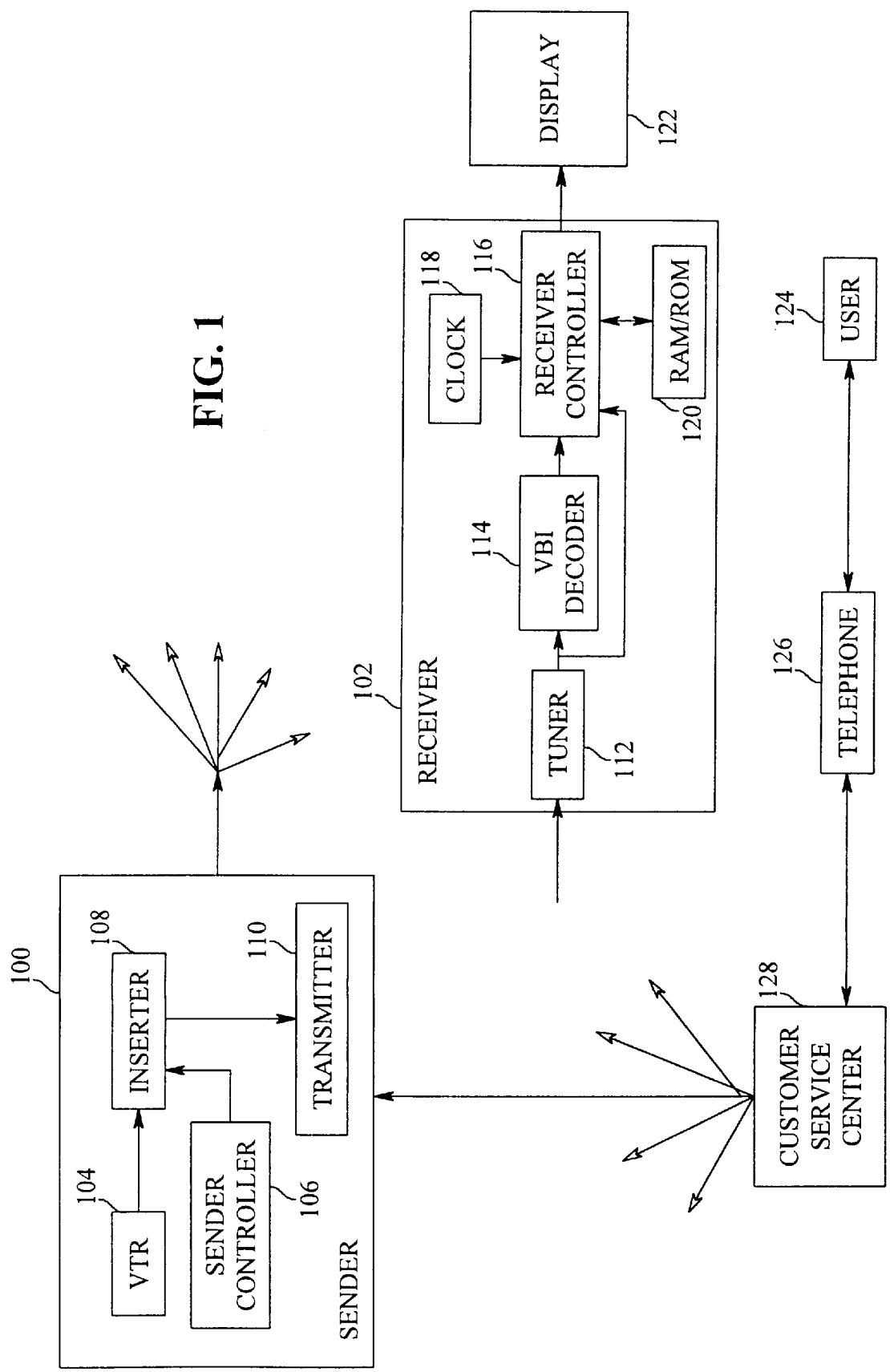
FIG. 1 is functional block diagram of a data transmission system used in the present invention.

FIG. 1 is functional block diagram of a data transmission system used in the present invention. As used herein, the terms "broadcast" and "transmit" are used interchangeably for the transmission of signals over cable or fiber optics, to or from satellites, over the air, and the like. A Sender (such as a network head end, station affiliate, or cable television company) 100 transmits a composite television signal containing inserted information in a portion thereof, typically the vertical blanking interval, to a plurality of Receivers 102. The Sender uses a Video Tape Recorder (VTR) 104 as a source of the information broadcast in the television signal. Sender Controller 106 provides data and commands to Inserter 108. The Inserter inserts data into the VBI of the composite television signal and provides the television signal to Transmitter 110, which in turn broadcasts the television signal.

Receivers obtain the television signal via antennas, satellite receivers, and cables (not shown). The Receiver 102 may be a VCR, television, or satellite device, or other receiving apparatus such as a Guide Plus+ device. Each Receiver 102 includes a Tuner 112 for tuning in a particular television signal being broadcast. The Tuner sends the television signal to the VBI Decoder 114. The VBI Decoder scans VBI lines 10–21 of fields 1 and 2 of the television signal and extracts any data resident in the signal. In addition, it is possible to use the first few visible lines in each video frame for VBI data, for example, lines 22–24. Lines 1 through 9 are typically used for vertical synchronization and equalization, and thus are not used to transmit data. Closed captioning and text mode data are generally transmitted on VBI line 21, field 1, of the standard NTSC video signal, at a rate of 2 bytes for each VBI line 21, field 1. The data in the VBI can be described in terms of the wave form, its coding and the data packet, all such details being well known in the art.

Data is sent at a data rate of 4 bytes/field/VBI line. If a Host commands both even and odd fields of a VBI line, then the transmission data rate is 240 bytes/sec. The data is sent and stored as compressed data, with a compression efficiency of about 2:1 (i.e., 100 bytes of real data is compressed into about 50 bytes of compressed data). Transmission overhead is about 60–70% (i.e., to send 100 bytes of data, an extra 60–70 bytes of packet overhead is sent).

Receiver Controller 116 interfaces with Clock 118 and a Random Access Memory (RAM)/Read Only Memory (ROM) memory device 120 to control the display of the television signal from Tuner 112 and decoded data packets from VBI Decoder 114 on the Display 122. The Clock has an output that is a function of time. The Receiver Controller preferably comprises a programmable microprocessor, microcontroller, or other similar control circuitry. It executes a program to manage reception of the data packets, interpretation of the fields of the data packets, and implementation of the commands included therein, including the enabling of display of a subscription television signal. The RAM/ROM 120 stores pre-packaged display screens, data packets received in the VBI lines, and other control information. The Display may be a television monitor, CRT display, computer monitor, and the like. The User 124 uses a standard Telephone 126 to communicate with Customer Service Center 128 to subscribe to a television subscription service or to terminate a television subscription service. The User 124 and the Receiver are co-located at the same site. The Customer Service Center may be a national or regional office providing subscription services to viewers. It may also include equipment for handling billing and accounting information relating to the subscription services provided. The Customer Service Center 128 interacts with the Sender 100 to request the insertion of appropriate data packets to enable or disable a subscription service to the Receiver corresponding to the User. The Customer Service Center interacts with multiple Senders all over a geographic region or the entire country. The Receiver Controller then enables or disables display of the subscription service. The User 124 may also use a remote controller with a standard infrared transmitter (not shown) coupled to an infrared receiver in the Receiver (not shown) to communicate with the Receiver Controller 116.

In the preferred embodiment, the total memory in the RAM/ROM 120 of a Receiver reserved for all data services (excluding TV Guide+ Gold) is 10 Kbytes. After decompression, this is equivalent to about 20 Kbytes of useable data. Each data service uses up to 10 Kbytes of memory. Each service announces its memory requirements in a Promotion Packet (described below). With this information, the Receiver knows whether it has enough memory for a new service. If it does not and the User tries to subscribe to it, an on-screen warning is displayed to the user. Independently, since all subscription activities are processed through the same Customer Service Center (which keeps track of all Machine IDs, services subscribed and memory available for each machine), it will be able to inform the User of his device's memory limitation. Within each data service, each sub-module accessible through a first level menu screen will also have a memory limit of 1K.

Each Receiver resident at a user's site receives free electronic television program guide information from one and only one Host. This Host is called the Normal SIP Host. A Normal SIP Host carries three different types of data packets, each of which will be described in further detail below. A Services Selection Packet is carried at SIP pre-load time. The minimum frequency of a Services Selection Packet is once per download of electronic program guide information. Activation Packets are carried at real-time and/or pre-load time as required. Other data packets are also carried when necessary.

The second type of Host is the Promotion Host. Receivers support a maximum of up to 24 services available for selection by a user, each service having its own Promotion Message carried with Promotion Packets. However, due to memory limitations, all of the Promotion Messages of the 24 services are not stored in advance in the RAM/ROM of the Receiver. Therefore, Promotion Packets are periodically sent by Promotion Hosts to Receivers. Whenever a user wants to read the Promotion Message of a service, the Receiver 102 uses the Tuner 112 to tune to the Promotion Host for that service and then looks for a Promotion Packet. It will stay tuned to that channel until a time out occurs (the length of times for time outs for the different services are specified in the Services Selection Packet described below) or the corresponding Promotion Packet of the selected service has been received. Promotion Packets can be sent by one or more Promotion Hosts. For example, all Promotion Packets can be sent on the same Host or each can be sent on a different Host. The Promotion Host may also be responsible for transmitting the Activation Packet. When a user calls the Customer Service Center to start a service subscription, an Activation Packet will be sent either immediately or as part of the pre-load process.

The third type of host is a Service Host. The Service Host is responsible for transmitting Service Program Related Information (PRI) Packets. The service downloads occur either in real-time (in a Real-time Subscription Services PRI Packet) or in a pre-load fashion (in a Pre-load Subscription Services PRI Packet) at time slots specified by the Services Schedule in the Services Selection Packet.

The fourth type of host is a TV Guide+ Gold SIP Host, which supplies a subscription-based electronic television program guide. Operationally, it works like a Normal SIP Host, although the data is obtained from a different source. The TV Guide+ Gold SIP Host carries Services Selection Packets at SIP download time (minimum frequency is once per download), Activation Packets at real-time and at download time, TV Guide Gold+ SIP Packets at SIP download time (minimum frequency is once per download), and other data packets are required.

Figure 2:
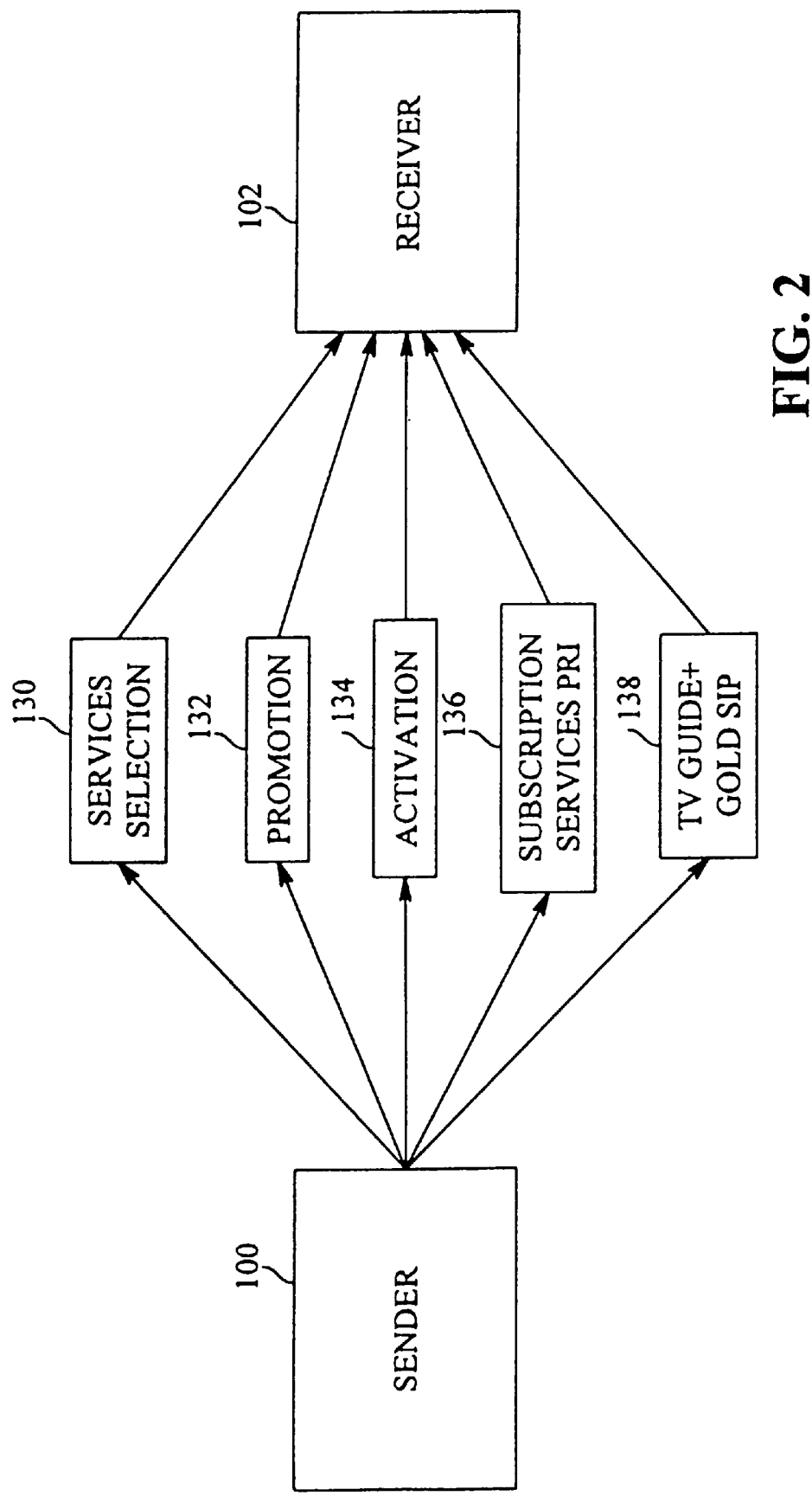
FIG. 2 is a block diagram illustrating the transmission of the data packets from the Sender to the Receiver.

There are five types of data packets transferred in the television signal in the preferred embodiment of the present system. FIG. 2 is a block diagram illustrating the transmission of the data packets from the Sender to the Receiver. The packets are decoded and implemented by the Receiver Controller 116 within the Receiver 102. These packet types include Services Selection Packets 130, Promotion Packets 132, Activation Packets 134, Subscription Services PRI Packets 136, and TV Guide+ Gold SIP Packets 138.

The Services Selection Packet 130 is a pre-load Type B packet. Type A packets are data packets for initializing Receivers for parameters such as zip code, channel map selections, etc. Type B packets are data packets for selecting Receiver operational features. The Services Selection Packet is the root element of subscription services. Each Receiver shall receive one and only one Services Selection Packet and store it into its internal memory. This packet should be transmitted before any other kind of packet for subscription services. Upon receipt of a Subscription Services Packet, the list of available subscription services is shown on the Display 122 after the User presses a "FEATURE" button on the Guide Plus+ device. Until this packet is received, no "FEATURE" button is shown on the Receiver's on-screen display. An update of services selection is achieved by sending a Services Selection Packet with a different signature. The Services Selection Packet is transmitted by a Normal SIP Host and by a TV Guide+ Gold Host at host download time. The packet is changed when services have changed, services memory requirements have changed, or a Promotion Message Location has changed.

FIG. 3 is an overview of some of the information contained in an example Services Selection Packet. The packet generally contains information on the number of selection services in the packet, the subscription identifier and promotion identifier of the subscription services, the channel number on which the subscription service information will be downloaded, the size of the subscription services, the name of the subscription services, and the host schedule of subscription services program-related information (PRI) and TV Guide+ Gold. Each packet includes a unique Subscription ID, which denotes a general category of subscription services, such as sports, music, science, etc.

FIGS. 4a–4c are diagrams of the format of a Services Selection Packet. The Services Selection Packet 130 contains many fields for controlling the presentation of services to the User. As shown in FIG. 4a, the packet type number field 200 in byte 1, when set to six, denotes that this packet is used for managing subscription services. Byte 2 contains the total number of blocks in this packet 202. The total length of the packet 204 from byte 3 to the end of the packet, measured in units of bytes, is stored in bytes 3 (least significant byte) and 4 (most significant byte). Byte 5 is reserved 206. The subscription packet type 208 is in byte 6. When this field has a value of 4Dh, it indicates that the packet is a subscription Service Selection Packet. The signature field 210 in bytes 7–8 is a unique identifier for each subscription Service Selection Packet. It may not have a value of 0000h. A promotion message timeout value 212 is stored in byte 9. It specifies a time in minutes between 2 and 255 before a promotion message times out. Bytes 10–11 are reserved 214. The number of selection services 216 is defined for this packet in byte 12. There may be from zero to 24 services listed in a Services Selection packet. A value of zero indicates that there are no selections available for the User. The number of selection services indicates how many selection services information blocks are contained in the packet below this field.

Bytes 13–40 store information on the first subscription service to be displayed to the User. The promotion message ID 218 is stored in byte 13. Byte 14 holds the Subscription ID of the first service 220. If the packet is used as a TV Guide+ Gold packet, then this field contains the value 30h. The guide channel of the first subscription services 224 is the television channel number on which the first subscription service will be downloaded is located in byte 15. In the example of FIG. 3, the guide channel was channel 2. The size of the first subscription services data is in byte 16. This field measures the size in terms of 256-byte blocks. Bytes 17–40 holds the name of the first subscription service. The name may be up to 24 characters long. If the name is less than 24 characters, the field is space-filled. Bytes 41–68 226 hold the second subscription service information. In a similar manner, the remainder of the subscription services are contained in bytes 69 to 684 228 as needed.

Continuing with FIG. 4b, byte number 685 holds the content length of the host schedules of the subscription services specified by this packet. This length is counted from byte 686 to the end of the host schedules. For example, if there are 8 schedules, then the value of the content length field would be 4+5*8=44 bytes, because each host schedule requires 5 bytes and there are four header fields in bytes 686–689. Bytes 686 and 687 232 are reserved. Pruning bytes for the schedules of subscription services 234 are located in bytes 688 and 689. Bits 4–7 of byte 688 and bits 4–7 of byte 689 are set to 0100b. Bits 0–3 of byte 688 are the pruning bits for schedules 0–3, and bits 0–3 of byte 689 are the pruning bits for schedules 4–7. Pruning of schedules only starts after the first Subscription Services PRI packet is received. The memory for storage of the subscription services information is cleared before the schedule is downloaded if the pruning bit for the schedule is set. The flags relating to the use of the guide channel number of the subscription service are located in bytes 690–691 236. Byte 692 238 holds the higher order bits of the schedule start time, and byte 693 240 holds the remainder of the schedule start time and the number of hours of the duration of the schedule. The number of minutes of the duration of the schedule is stored in byte 694. The guide channel number, schedule start time and duration time fields are repeated in bytes 695–729 244 for the second through the eighth schedules.

Turning now to FIG. 4c, fields similar to those used for specifying the host schedules of subscription services are used for specifying the host schedules for TV Guide+ Gold services. Byte 775 246 stores the maximum compressed length of the first level detail text. The maximum number of characters is 48. The first level detail compressed text 248 is stored in bytes 776–824.

Referring back to FIG. 2, the Promotion Packet 132 is a real-time Type B packet that contains textual promotional information about a subscription service. It also indicates if the service is available on a "free trial" basis to the user. The Receiver accesses and receives it only when initiated by the User. The Promotion Packet contains a Promotion Services Identifier (PID), a Broadcast ID used by the Receiver to generate a seven digit Service ID to be displayed on the Display (the User uses this Broadcast ID to identify the service he/she wants to subscribe to when he/she calls the Customer Service Center), an indicator to show whether a "free trial" period is available for the service, and if available, how long the free subscription period is, and promotional text to introduce the service to the User. Promotion Packets are transmitted by a Promotion Host all day long, however, the maximum cycle time shall not be longer than the time supplied in the Services Selection Packet. Promotion Packets are changed when the content of the Promotion Message has changed. A User can view a promotion message as a result of pressing a VIEW button on the Guide Plus+ device. In order to activate the display of the promotion message, there must be at least one promotion ID in the subscription Service Selection Packet that matches the Promotion Services ID.

FIG. 5 is a diagram of the format of the Promotion Packet. As shown in FIG. 5, the packet type number field 250 in byte 1, when set to six, denotes that this packet is used for managing subscription services. Byte 2 contains the total number of blocks in this packet 252. The total length of the packet from byte 3 to the end of the packet 254, measured in units of bytes, is stored in bytes 3 (least significant byte) and 4 (most significant byte). Byte 5 is reserved 256. The subscription packet type 258 is in byte 6. When this field has a value of 50h, it indicates that the packet is a subscription Promotion Packet. A Promotion Services ID 260 is stored in byte 7. This identifier must match one of the promotion IDs in the Services Selection Packet. Bytes 8–11 are reserved 262. The next four fields define locations on the display where the User ID and the Service ID are shown. The row input position of the User ID 264 is located in byte 12. The upper left corner of the second level details area of the screen is considered to be origin (0,0) of a local display coordinate system. The range of values for the row input position of the User ID is zero to 6h. The column input position of the User ID 266 is located in byte 13. The range of values for the column input position of the User ID is zero to 16h. The row input position of the Service ID 268 is located in byte 14. The range of values for the row input position of the Service ID is zero to 6h. The column input position of the Service ID 270 is located in byte 15. The range of values for the column input position of the Service ID is zero to 18h. The Broadcast ID 272 is a packed binary coded decimal (BCD) representation of the displayed Service ID. Byte 16 holds the third and fourth digits of the Service ID, and byte 17 holds the fifth and sixth digits of the Service ID. Bytes 18 and 19 store the expiration time of the free trial. If this field is zero, then no free trial is available. The subscription ID 276 is found in byte 20. Bytes 21–27 are reserved 278.

Textual information for the Promotion message begins at byte 28. At this location, a first level detail length value 280 is found. The maximum number of bytes for a first level detail message is 48 compressed characters. Next, the first level detail promotion message 282 is stored in a variable number of bytes beginning with byte 29. If there is no data for a first level detail, then this field is zero-filled. Second level details begin where the first level details leave off in the packet. Each page of promotional information is accompanied by a length field as shown. The maximum number of bytes for a second level detail message is 231 decompressed characters. Again, if there is no data for the message, then the fields are zero-filled.

Referring back to FIG. 2, the Activation Packet 134 is a pre-load or real-time Type B packet that performs three different functions. It can start or extend a particular subscription service to any single user or a group of users. It can shorten or even terminate the subscription of any single user or a group of users. It can also modify a user's User ID. An Activation Packet contains an action indicator to signify the type of action that is going to be taken, a User ID (or User ID range) to activate a Receiver, a new User ID to change a Receiver's User ID, and an expiration date to extend, shorten or terminate a subscription for a single or group of Receivers. The User ID is calculated by a random number generator. Activation Packets are transmitted by a Normal SIP Host, a TV Guide+ Gold Host, a Promotion Host, and a Services Host. Activation Packets can be transmitted at download time as a pre-load packet by the Normal SIP Host, TV Guide+ Gold Host, and Services Host, and by a Promotion Host as a real-time packet immediately after the user calls a. Customer Service Center to activate a service. Activation Packets are changed when an activation/deactivation of a service occurs or when a Receiver device ID change is required.

FIG. 6 is a diagram of the format of an Activation Packet. The packet type number field 284 in byte 1, when set to six, denotes that this packet is used for managing subscription services. Byte 2 contains the total number of blocks in this packet 286. The total length of the packet from byte 3 to the end of the packet 288, measured in units of bytes, is stored in bytes 3 (least significant byte) and 4 (most significant byte). Byte 5 is reserved 290. The subscription packet type 292 is in byte 6. When this field has a value of 41h, it indicates that the packet is an Activation (and deactivation) Packet. The signature field 294 in bytes 7–8 is a unique identifier for each subscription Service Selection Packet. It may not have a value of 0000h. Byte 9 296 holds a value indicating whether the packet is used for activating/deactivating an individual user or a group of users. When the field has a value of 30h, then individual activation/deactivation is selected. When the field has a value of 31h, then mass activation and deactivation is selected. When individual activation/deactivation is selected, bytes 10–13 298 hold the old User ID in a packed BCD format. When mass activation/deactivation is selected, the bytes 10–13 hold a starting range of User IDs to be activated or deactivated. When individual activation/deactivation is selected, bytes 14–17 300 hold the new User ID in a packed BCD format. When mass activation/deactivation is selected, the bytes 14–17 hold an ending range of User IDs to be activated or deactivated. The Subscription ID 302 of the subscription service to be activated or deactivated is found in byte 18 of the Activation Packet. The expiration time 304 of a free trial period is specified in bytes 19 and 20. The value is in terms of days remaining in the trial period. For example, a value of 3Dh indicates 60 days (or two months) are left in the free trial period. If this is a deactivation packet, then this value is zero. The warning day field 306 is in byte 21 and the warning month field 308 is in byte 22. If the expiration date is less than the warning date, then an expiration warning screen is displayed to the User. The telephone number 310 to dial to activate or deactivate a subscription service is stored in bytes 24–43 of the packet. If the telephone number is less than 20 bytes, then the remaining bytes are filled with the value 20h (i.e., ASCII blanks). Finally, bytes 44–64 312 are filled with the null character to enable scrambling.

Referring back to FIG. 2, the Subscription Services Program Related Information (PRI) Packet 136 is a pre-load or real-time Type B packet that contains PRI and service data. Subscription Services PRI Packets include encapsulated PRI data and a Subscription Service ID. A Receiver uses the Subscription Service ID to determine whether the packet should be received and stored. The Subscription Services PRI Packet is transmitted by a Services Host as a pre-load packet at services download time as specified in a Services Selection Packet or at other times as a real-time packet. It is changed when new PRI is available. If a service is subscribed, its service PRI can be correctly received.

FIG. 7 is a diagram of the format of a Subscription Services Program Related Information (PRI) Packet. The packet type number field 314 in byte 1, when set to six, denotes that this packet is used for managing subscription services. Byte 2 contains the total number of blocks in this packet 316. The total length of the packet from byte 3 to the end of the packet 318, measured in units of bytes, is stored in bytes 3 (least significant byte) and 4 (most significant byte). This value is used to calculate the address of the next subscription. Byte 5 is the length of the compressed text title of the subscription service 320, counted from byte 6 to the end of the title. The subscription packet type 322 is in byte 6. When this field has a value of 53h, it indicates that the packet is a Subscription Services PRI Packet. The Subscription ID 324 is stored in byte 7, and byte 8 326 is reserved. The signature field 328 in bytes 9–10 is a unique identifier for each Subscription Services PRI Packet. The compressed text title of the subscription service 330 starts in byte 11. It is limited to 20 uncompressed characters. The first level detail length field 332 follows the title. The first level detail is limited to 60 uncompressed characters. Next, the packet contains the first level detail compressed text. If no data is provided, this field is 00h. The second level detail length field 336 follows after the first level detail text. If the second level detail length is less than 255 characters, then only one byte is used for the length field, otherwise two bytes are used. Finally, the second level detail compressed characters 338 follow the second level detail length field. If no data is provided, this field is 00h. In the preferred embodiment of the present invention, the size of the buffer in the Receiver holding the compressed text is 510 bytes, and the size of the uncompressed buffer is 1022 bytes.

Referring back to FIG. 2, the TV Guide+ Gold SIP Packet 138 is a pre-load Type B packet that is similar to a normal Services Selection packet except that only Receivers subscribing to the TV Guide+ Gold service can receive it. The Packet contains Show Information Packet (SIP) data generated by TV GUIDE magazine and is transmitted by a TV Guide+ Gold Host at download time. It is changed every day. FIGS. 4a–4c discussed above also illustrate the fields of a TV Guide+ Gold SIP Packet.

Figure 8:
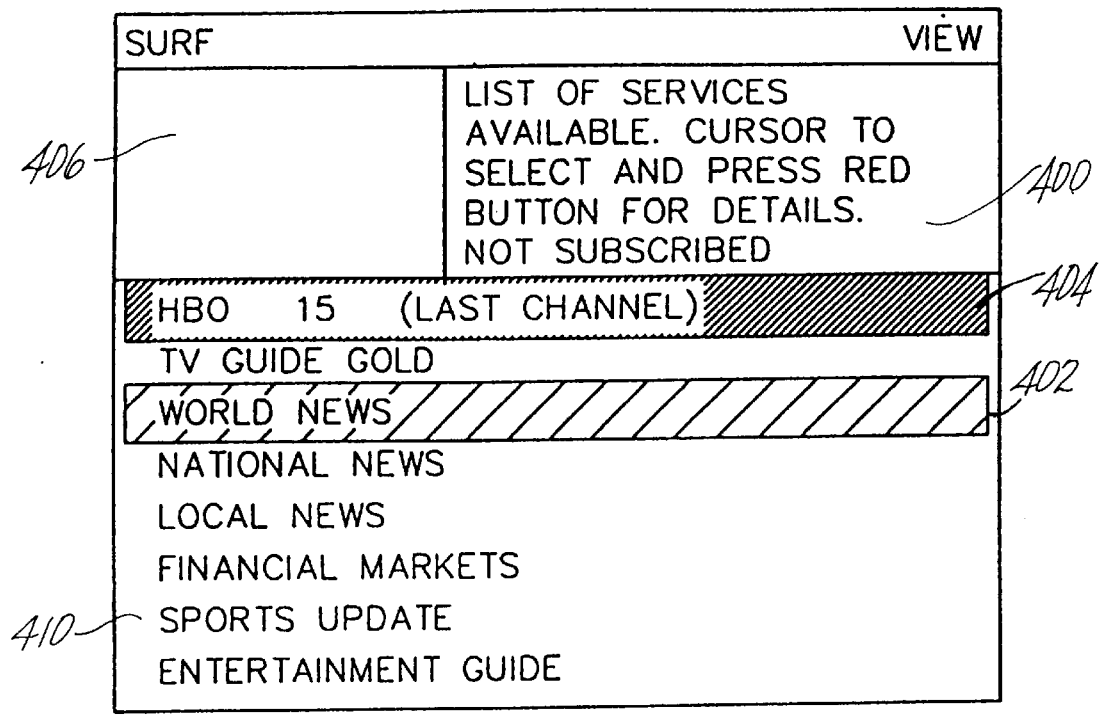
FIG. 8 is an example of a display of a Services Selection Page.

For illustrative purposes, an example of using the television subscription system and method according to the preferred embodiment is now described. After the user has completed the initial setup of a Receiver, the user receives electronic television program guide data and program related information (PRI) from a television programming source (Host). When the electronic program guide data is downloaded in a television signal from the Normal SIP Host, a Services Selection Packet is sent at the same time and stored in the Receiver's RAM. As discussed above, the Services Selection Packet provides information to the Receiver concerning the available subscription services. Subsequently, when the user displays the guide on the television screen, a green "FEATURE" button is shown on-screen as one of four soft color buttons. If the user presses a green button on the user's Guide Plus+ device, the Services Selection Page is shown on the television screen. FIG. 8 is an example of a display of a Services Selection Page. The words "not subscribed" 400 describe the status of the item 402 currently highlighted by the cursor. In this example, "World News" has not yet been subscribed to by the user. The first line in the second level details area 404 "HBO 15 (Last Channel)" describes the contents of the Picture-In-Picture (PIP) window 406. The PIP window 406 displays the program from a television signal from the last channel accessed by the system.

The user can choose a service by moving the cursor down to a selected item and then pressing a red "View" button on the Guide Plus+ device. The Receiver automatically tunes to a Promotion Host for the selected service (note that the Promotion Host may actually be a different television broadcast station than the Normal SIP Host). For example, suppose the user wants to find out more information about the "Sports Update" service 410 shown in FIG. 8. The user moves the cursor to highlight the Sports Update line and presses a red "View" button on the Guide Plus+ device. A wait message is then displayed on the screen during tuning of the selected service.

Figure 9:
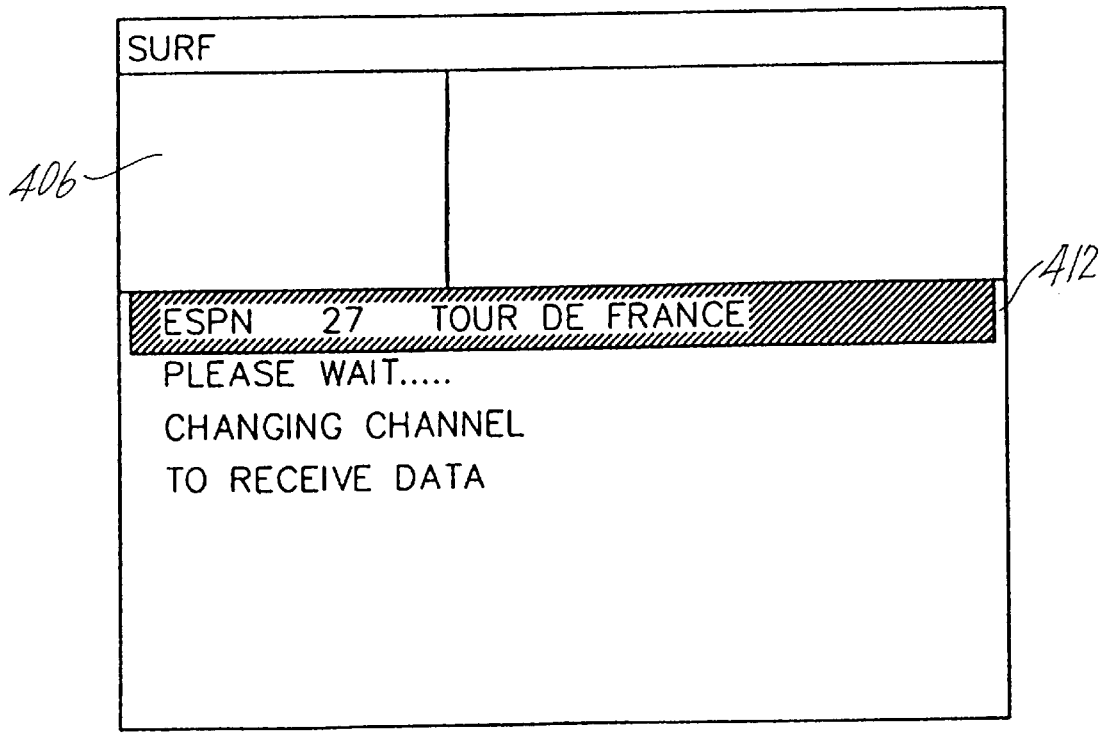
FIG. 9 is an example of a display of a wait message.
Figure 10:
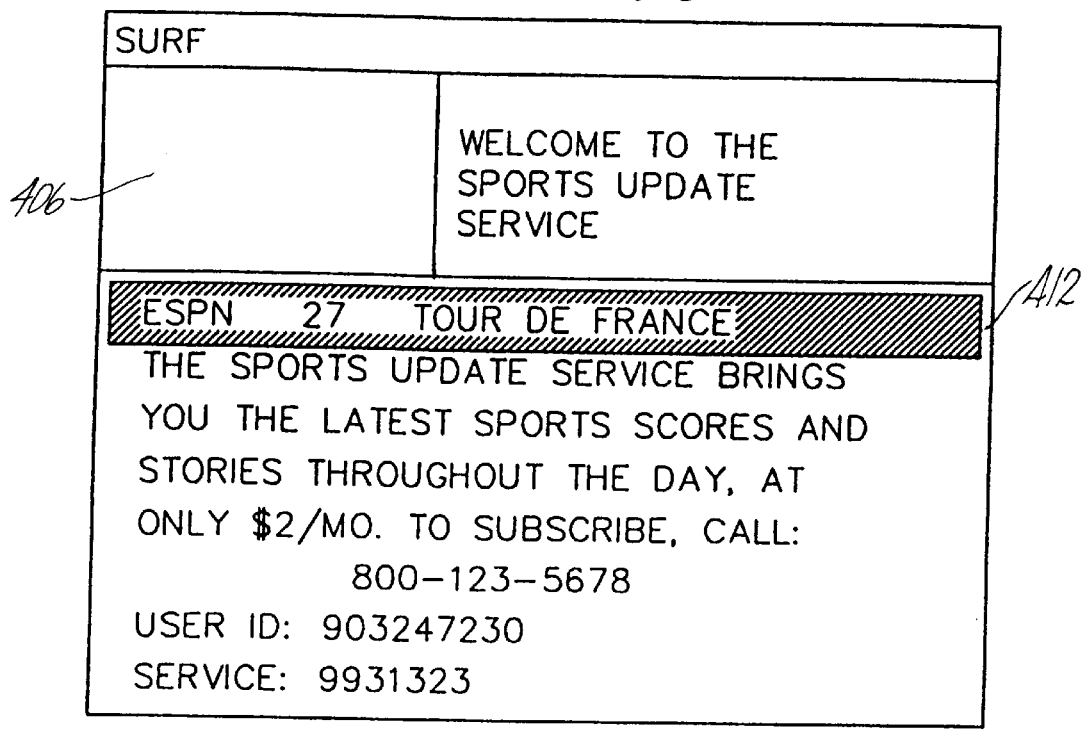
FIG. 10 is an example of a display of a Promotion Message screen.

FIG. 9 is an example of a display of a wait message. In the example wait message, the "Sports Update" service selected is the ESPN television network, which is currently broadcasting the Tour De France bicycle race. This information is displayed to the user in the highlighted second level details area 412. The selected service is received and displayed on the PIP window 406. After a short time, a real-time Promotion Packet containing the Promotion Message is received. The Promotion Message gives the user a brief description of the service and tells the user how to subscribe to the service. FIG. 10 is an example of a display of a Promotion Message screen. Note that it lists service information 414 the service cost, a telephone number to call to subscribe to the service, a User ID and a Service ID.

The User 124 subscribes to a service by calling the Customer Service Center 128 at the telephone number listed on the television screen. The User is asked to enter the displayed User ID and Service ID via the telephone keypad. The User ID is a unique number making each Receiver individually addressable. The Service ID identifies the service to be activated. The User is also asked to enter the desired length of subscription in months or whether the User wants a month-by-month subscription (with an automatic renewal and charging unless the User calls the Customer Service Center to terminate the subscription). The User is then asked to provide credit card and address information for billing purposes.

Figure 11:
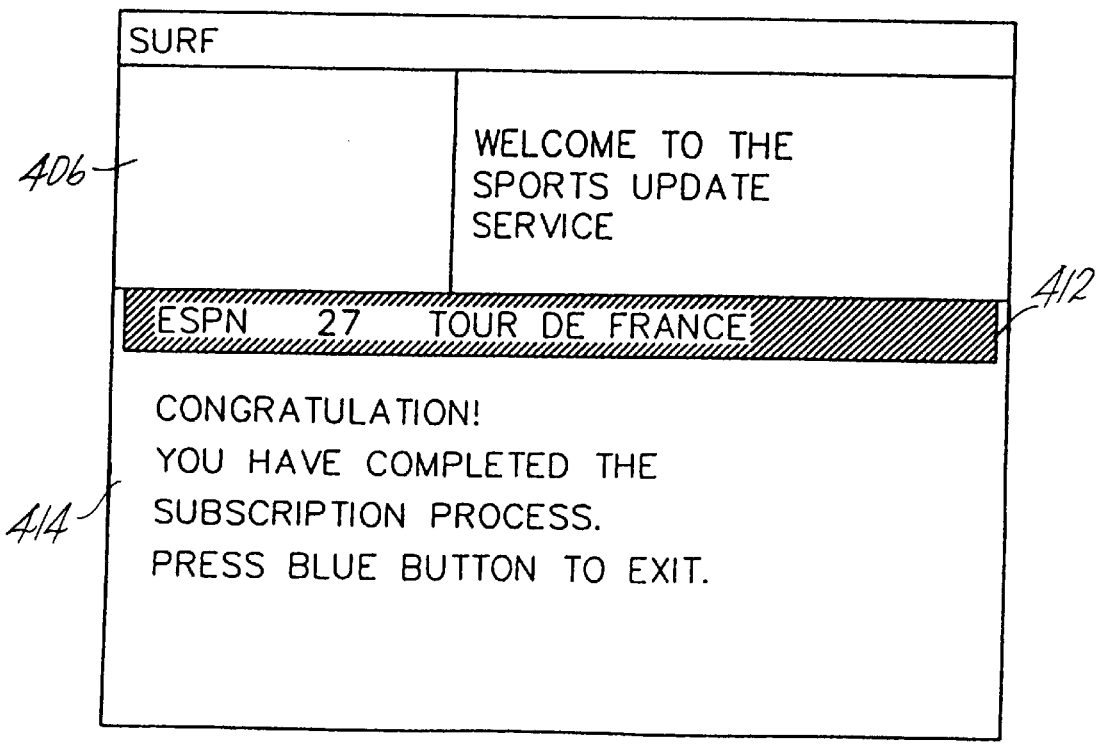
FIG. 11 is an example of a display of a confirmation message after the user has subscribed to a service.

Next, an Activation Packet is sent immediately on the same Promotion Host, in which case the service starts immediately. Upon receiving the Activation Packet, the Receiver displays a confirmation message to the user. FIG. 11 is an example of a display of a confirmation message 414 after the user has subscribed to a service. Note that pushing a blue "Surf" button on the User's Guide Plus+ device returns the User to the main guide screen.

For efficiency reasons, Activation Packets addressing many different Receivers can be sent overnight as part of the program guide data pre-load operation. In this case, there will be no immediate confirmation screen. The User is told over the telephone that the newly subscribed service will begin the next day and the User is instructed to return to the main guide screen by pressing the "Surf" button.

A User 124 can cancel or shorten the length of subscription for a service at any time by telephoning the Customer Service Center 128. The User is asked to provide the User ID, Service ID and other user identification information. Deactivation is effected by an Activation Packet, which can be sent immediately or one or many times as part of guide data pre-load operation in an off-peak time (such as the middle of the night).

A subscription service may want to offer free trials to users as an inducement for the users to subscribe to the service. Free trials may be offered in two ways. The first is as part of the normal subscription process. When the User calls the telephone number to subscribe to the selected service, the User may be informed that for a one year subscription, the first month is free and the User can cancel the service at any time. The User will be billed for 11 months, starting on the second month of service. In this way, a free trial is provided as part of the normal subscription process.

Figure 12:
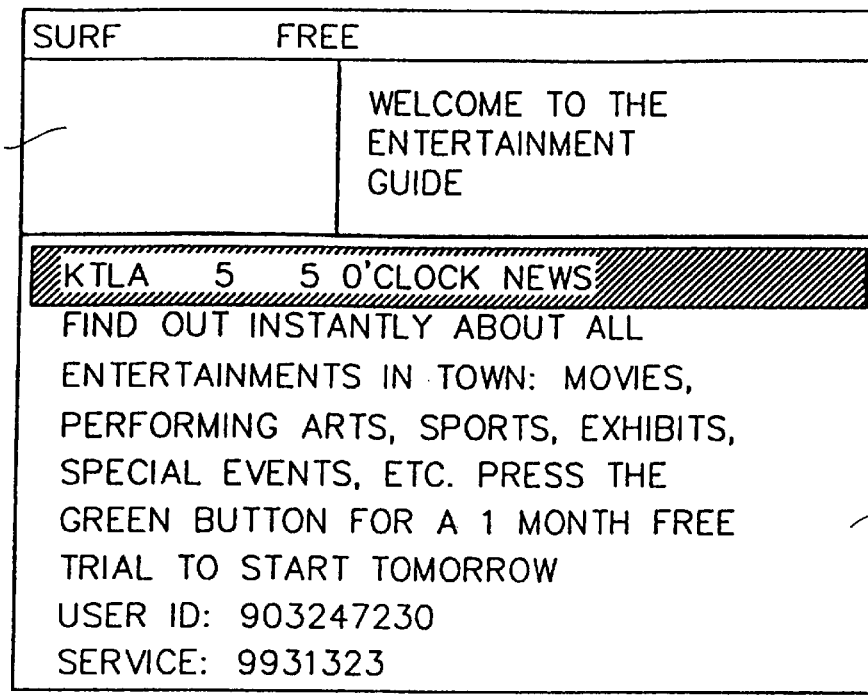
FIG. 12 is an example of a display of a free trial message.

The second way to offer a free trial is as an instant free trial offer to all users. As part of the Promotion Packet, a flag may be set to enable an easier way of providing a free trial without the User having to call in to the Customer Service Center. Upon receiving the flag, the Receivers direct the Display to show a green soft button with the word "Free", together with a Promotion Message. FIG. 12 is an example of a display of a free trial message 416. The second level detail area in FIG. 12 shows that "KTLA 5 5 O'Clock News" 418 is the program currently being shown in the PIP window 406.

Figure 13:
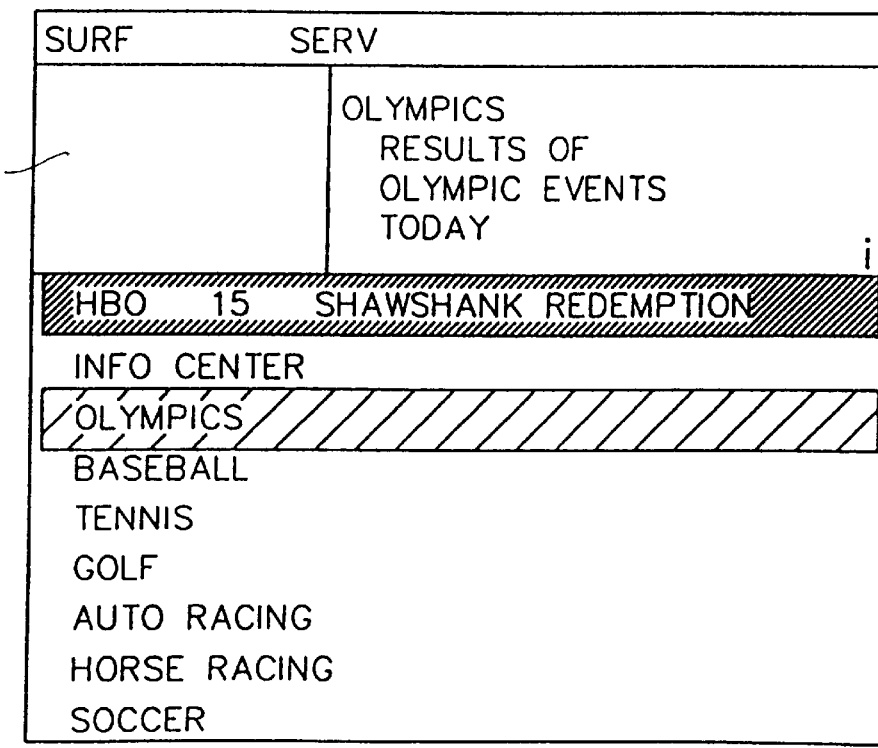
FIG. 13 is an example of a display of a Sports Update Service showing levels of menus.

A data service consists of a text file with one or more levels of menu pages to be displayed on the Display to allow random access to individual entry points in the file. FIG. 13 is an example of a display of a Sports Update Service showing levels of menus. Note that "Olympics" is currently highlighted by the cursor 420. When the User presses the "Info" button on the Guide Plus+ device coupled to the Receiver, a second level menu page is displayed. The second level detail area in FIG. 13 shows that "HBO 15 Shawshank Redemption" 422 is the program currently being shown in the PIP window 406. FIG. 14 is an example of a display of a second level menu page. Note that no highlighted banner is shown. More information at this level of the menu hierarchy may be displayed by pressing the down arrow cursor button. At this point, if the user presses the "1" key, a third level menu page is shown on the Display. This menu page would show the different events of "Track and Field." If the user presses the "6" key, a third level menu page might show, for example, the latest scores or stories relating to table tennis 424. FIG. 15 is an example of a display of the Table Tennis third level menu page. The User causes the second page of the story to be shown by pressing the down arrow cursor button.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patent is set forth in the appended claims.

What is claimed is:

1. A subscription television system for providing selected current information from a subscription service provider to an individually addressable television viewer comprising:

means for subscribing by the individually addressable television viewer to at least one subscription information service provided by the subscription service provider;

means located at the subscription service provider for sending data packets to the individually addressable television viewer, the sending means comprising first means for building one or more subscription data packets, at least one including a selected current information of the subscription information service subscribed;

second means for building an activation data packet uniquely identified for the individually addressable television viewer, the activation data packet including enabling data identifying a subscription data packet including the selected current information;

means for inserting said data packets into a vertical blanking interval of a television signal;

means for transmitting the television signal; and means for receiving subscription requests from the subscribing means and for controlling insertion of said data packets into the television signal;

means co-located with the individually addressable television viewer for receiving the television signal, the receiving means comprising first means for accepting the activation data packet in the television signal when the activation data packet is identified for the individually addressable television viewer, and for extracting the enabling data from the accepted activation data packet;

first means for storing the extracted enabling data;

second means for accepting the subscription data packet in the television signal identified by the enabling data, and for extracting the subscription information;

second means for storing the extracted subscription information; and means for controlling display of the extracted subscription information when requested by the individually addressable television viewer; and means for displaying the extracted subscription information to the individually addressable television viewer.

2. The subscription television system of claim 1, wherein the selected current information comprises international, national, or local news information.

3. The subscription television system of claim 1, wherein the selected current information comprises sporting event results.

4. The subscription television system of claim 1, wherein the selected current information comprises television programming schedule information.

5. The subscription television system of claim 1, wherein the selected current information comprises financial market news information.

6. The subscription television system of claim 1, wherein the subscription data packet comprises a list of available subscription information services.

7. The subscription television system of claim 1, wherein the activation data packet comprises information for starting or extending access for an individually addressable television viewer to a selected subscription information service.

8. The subscription television system of claim 1, wherein the subscription data packet comprises television program related information for storage in the second storing means.

9. The subscription television system of claim 1, wherein the subscription data packet comprises television programming schedule information.

10. In a subscription television system, a method for providing selected current information from a subscription service provider to an individually addressable television viewer comprising the steps of:

subscribing by the individually addressable television viewer to at least one subscription information service provided by the subscription service provider;

building one or more subscription data packets, at least one including selected current information of the subscription information service subscribed to by the individually addressable television viewer;

building an activation data packet including enabling data identifying the subscription data packet including the selected current information;

inserting said data packets into a vertical blanking interval of a television signal;

transmitting the television signal by the subscription service provider;

receiving the television signal by the individually addressable television viewer;

accepting the activation data packet in the television signal when the activation data packet is identified for the individually addressable television viewer;

extracting the enabling data from the accepted activation data packet;

accepting the subscription data packet in the television signal identified by the enabling data;

extracting the selected current information from the accepted subscription data packet; and displaying the extracted subscription information to the individually addressable television viewer when requested by the individually addressable television viewer.

11. The method of claim 10, wherein the subscription television system includes a television screen and the displaying step comprises the step of displaying a television program carried by the television signal in a first portion of the television screen while the extracted selected current information is displayed in a second portion of the television screen.

12. The method of claim 11, wherein the displaying step further comprises the step of displaying information identifying the channel number and network name on the television screen corresponding to the television program being displayed.

13. The method of claim 10, wherein the extracted selected current information comprises menus of textual information and the method further comprises the step of scrolling by the individually addressable television viewer through the menus.

14. The method of claim 10, wherein the subscribing step comprises the steps of placing a telephone call to the subscription service provider by the individually addressable television viewer, displaying a unique subscriber identifier on the television screen, and communicating the unique subscriber identifier and a subscription information service identifier from the individually addressable television viewer to the subscription service provider via a telephone keypad.

15. The method of claim 10, wherein the displaying step comprises the step of displaying a list of available subscription services.

16. The method of claim 10, wherein the selected current information comprises international, national, or local news information.

17. The method of claim 10, wherein the selected current information comprises sporting event results.

18. The method of claim 10, wherein the selected current information comprises television programming schedule information.

19. The method of claim 10, wherein the selected current information comprises financial market news information.

20. The method of claim 10, wherein the step of building a subscription data packet comprises the step of building a data packet comprising a list of available subscription information services.

21. The method of claim 10, wherein the step of building an activation data packet comprises the step of building a data packet comprising information for starting or extending access for an individually addressable television viewer to a selected subscription information service.

22. The method of claim 10, wherein the subscription television system comprises means for storing the selected current information at the individually addressable television viewer's site and wherein the step of building a subscription data packet comprises the step of building a data packet comprising television program related information for storage in the storing means.

23. The method of claim 10, wherein the step of building a subscription data packet comprises the step of building a data packet comprising television programming schedule information.

24. The method of claim 10, wherein the individually addressable television viewer is uniquely identified by a randomly generated number.

25. The method of claim 10, wherein the subscription television system comprises a memory and the step of accepting one of said data packets comprises the step of storing the accepted data packet in the memory and the step of extracting one of said data packets comprises the step of reading the extracted data packet from the memory.

26. The method of claim 10, wherein the receiving step comprises the step of receiving the television signal on a television channel dynamically selectable by the individually addressable television viewer.

27. The method of claim 10, further comprising the step of canceling an individually addressable television viewer's subscription to the at least one subscription information service.

28. The method of claim 10, wherein the extracted selected current information comprises a plurality of levels of menu pages, each menu page having a plurality of lines of characters.

29. In a subscription television system having a television screen, a method for providing selected current information from a subscription service provider to an individually addressable television viewer comprising the steps of:

building a promotional data packet comprising promotional information about a selected subscription information service, the promotional information comprising a description of the selected subscription information service and instructions on how to subscribe to the selected subscription information service;

inserting the promotional data packet into a vertical blanking interval of a television signal representing a television program;

transmitting the television signal by the subscription service provider;

accepting the promotional data packet;

displaying the promotional information on the television screen;

subscribing by the individually addressable television viewer to the selected subscription information service provided by the subscription service provider;

building a subscription data packet including the selected current information of the subscription information service subscribed to by the individually addressable television viewer;

building an activation data packet including enabling data identifying the subscription data packet, the activation data packet being uniquely identified for the individually addressable television viewer;

inserting the activation packet and the subscription data packet into the vertical blanking interval of the television signal;

transmitting the television signal by the subscription service provider;

receiving the television signal by the individually addressable television viewer;

accepting the activation data packet in the television signal when the activation data packet is identified for the individually addressable television viewer;

extracting the enabling data from the accepted activation data packet;

accepting the subscription data packet in the television signal identified by the enabling data;

extracting the selected current information from the accepted subscription data packet; and displaying the selected current information on the television screen.

30. The method of claim 29, wherein the extracted information is displayed only when requested by the individually addressable television viewer.

31. The method of claim 29, wherein the selected current information comprises at least one of news information, sporting event results, television programming schedule information, or financial market news information.

32. The method of claim 29, wherein the subscription data packet comprises at least one of an available subscription information services list, information about a television program, or television programming schedule information.

33. The method of claim 29, wherein the promotional information includes a subscription information service identifier, and wherein the subscribing step comprises the steps of placing a telephone call to the subscription service provider by the individually addressable television viewer, displaying a unique subscriber identifier on the television screen with the promotional information, and communicating the unique subscriber identifier and the subscription information service identifier from the individually addressable television viewer to the subscription service provider via a telephone keypad.

34. The method of claim 29, wherein in the step of displaying the promotional information on the television screen comprises displaying the television program in a first portion of the television screen and displaying the promotional information in a second portion of the screen.

35. The method of claim 29, wherein in the step of displaying the selected current information on the television screen comprises displaying the television program in a first portion of the television screen and displaying the selected current information in a second portion of the screen.

\* \* \* \* \*